Patented Apr. 17, 1934

1,954,826

UNITED STATES PATENT OFFICE

1,954,826
RESIN AND COATING OR PLASTIC COMPOSITIONS CONTAINING THE SAME

William Henry Moss, London, England, assignor to Celanese Corporation of America, a corporation of Delaware No Drawing. Application April 4, 1932, Serial No. 603,225

20 Claims. (Cl. 260—4)

This application is a continuation in part of my application S. No. 405,537 filed 7th November 1929, and relates to the production of synthetic resins from dihydroxy-benzophenones and aldehydes, and also to coating or plastic compositions containing the synthetic resins and derivatives of cellulose, particularly organic derivatives of cellulose.

Many difficulties are encountered when it is desired to prepare a lacquer containing derivatives of cellulose, such as cellulose acetate, which is suitable for application to a hard, smooth surface. This is due in great measure to the fact that films from lacquers containing cellulose acetate or other cellulose derivative as the sole constituent of the lacquer base do not adhere well to smooth surfaces. When, however, attempts are made to impart the necessary adhesive qualities to such lacquers by incorporating natural gums or resins therein both the lacquer and the film become cloudy and unhomogeneous.

I have now discovered that synthetic resins may be produced by the condensation of an aldehyde with a dihydroxy-benzophenone in the presence of a suitable condensing agent which are compatible with cellulose derivatives, particularly cellulose acetate, and which when incorporated in lacquers containing such compounds form clear solutions from which clear, hard, tough and firmly adherent films may be obtained upon drying. In accordance with my invention, therefore, I prepare synthetic resins by reacting an aldehyde with a dihydroxy-benzophenone, in the presence of a suitable condensing agent. While alkaline condensing agents may be used, it is preferable to employ an acid condensing agent, e. g. zinc chloride, and particularly a strong acid condensing agent such as hydrochloric, sulphuric or phosphoric acid. The resins thus obtained may be employed for making lacquers or plastic compositions which contain one or more cellulose derivatives, and which may also contain natural or semi-synthetic resins or gums, plasticizers, low, medium and high boiling solvents, pigments and dyes.

Solutions may thus be formed containing a cellulose derivative and a resin which are suitable for use as lacquers or coating compositions for metal, glass or other substances, and which may also be employed for the manufacture of photographic or other films. Further, artificial yarns may be obtained by extruding a solution containing a cellulose derivative and the resin through the orifices of a spinnerette, either into an evaporative atmosphere as in dry spinning or into a coagulating bath as in wet spinning. A solution containing the resin and, if desired, a cellulose derivative, may also be employed as an adhesive which is particularly useful in effecting adhesion between sheets of celluloid or organic derivatives of cellulose and sheets of glass in the manufacture of laminated glass.

Plastic compositions containing cellulose derivatives and the resin, together, if desired, with plasticizers and/or high boiling solvents, may be worked into sheets, which may be used in the manufacture of laminated glass or into blocks or articles in any suitable manner. While the uses of the resin are described in this application particularly in connection with cellulose acetate, it is also of value for use with other derivatives of cellulose such as cellulose nitrate, organic esters of cellulose, for example cellulose formate, propionate or butyrate, ethyl, methyl, benzyl or other cellulose ethers, mixed esters for example cellulose nitro-acetate and ether-esters of cellulose.

Among suitable volatile solvents which may be employed in compositions according to the present invention may be mentioned acetone, alcohol, benzene, and ethylene and methylene dichlorides, while medium and high boiling solvents comprise ethyl acetate, ethyl lactate, tetrachlorethane, benzyl alcohol and diacetone alcohol. The particular solvent employed will of course depend upon the characteristics of the cellulose derivative and other substances which may be present in the composition. Suitable plasticizers for use according to the present invention comprise diphenylol propane, triacetin, dibutyl tartrate, diethyl phthalate and monomethyl xylene sulphonamide. If desired fire retardants may be added, for example brominated tricresyl phosphate or other bromine derivatives of organic compounds. Any suitable pigments or dyes, such as those commercially employed in the paint or lacquer industry, may be used.

As stated above, the composition may also contain natural or semi-synthetic resins or gums, amongst which may be mentioned, Manila, accaroids, pontianak, kauri, dammar, rosin, shellac, and ester gum, while other synthetic resins, for example fusible and soluble phenol-formaldehyde and diphenylol propane-formaldehyde resins, preferably such as are prepared in the presence of acid catalysts, may also be present.

As stated above, the synthetic resins of the present invention are prepared by the condensation of an aldehyde with a dihydroxy benzophenone in the presence of a suitable condensing agent, for example hydrochloric acid. While formaldehyde is preferably used the invention is by no means limited thereto, and other aldehydes or substances yielding aldehyde, for example, paraformaldehyde, metaformaldehyde, acetaldehyde and hexamethylene tetramine, may be employed. The dihydroxy-benzophenone may have the hydroxy groups in the same or different radicals, and other nuclear substituent groups, e. g. alkyl groups, may be present. Thus among suitable compounds may be mentioned 4.4'-dihydroxy-benzophenone, 2.4'-dihydroxy-benzophenone and 2.4-dihydroxy benzophenone and their dimethyl derivatives in which the two methyl groups are in the 3.3' positions.

The following examples are given of the manufacture of the resin and its use in coating or plastic compositions, but it is to be clearly understood that they do not limit the invention in any way. If desired, the clarity of the compositions may be improved by addition of a small proportion of ammonia.

Example 1

242 parts of 3.3'-dimethyl-2.4'-dihydroxy-benzophenone are condensed with 100 parts of 40% formaldehyde solution in the presence of 10 parts of concentrated hydrochloric acid, by heating under reflux at about 130° C., using either direct heating or oil heating; in from 6 to 12 hours a brown resin separates from the reactants, and heating is continued until the resin is quite hard at ordinary temperatures. It is then separated from the watery layer and is purified by washing with water, dilute alkali solution or dilute solutions of organic solvents, or by vacuum, steam or ordinary distillation. After washing it may be fused to a clear, transparent resin. As thus produced, the resin is a light brown product, which is compatible with cellulose acetate. It is soluble in the common solvents and may readily be incorporated in films, plastics, coating compositions, etc.

In a similar manner a synthetic resin may be obtained by condensing 214 parts of 2.4' hydroxybenzophenone with 100 parts of 40% formaldehyde solution in the presence of 10 parts of concentrated hydrochloric acid.

Example 2

The 3.3'-dimethyl-4.4'-dihydroxy benzophenone is used in place of the 3.3'-dimethyl 2.4'-dihydroxy benzophenone employed in the above example. The reaction is carried out under similar conditions, heating being continued for 12 hours before the purification of the resin is commenced. A resin very similar to the above in compatibility with cellulose acetate is produced.

In a similar manner a synthetic resin may be obtained by the use of equivalent proportions of 4.4' dihydroxy benzophenone.

Example 3

A coating composition containing the resin may be made as follows:

| | Parts by weight |
|---|---|
| Cellulose acetate | 10 |
| Synthetic resin | 1 to 20 |
| Acetone | 100 |

Example 4

The following is another example of a coating composition:

| | Parts by weight |
|---|---|
| Cellulose acetate | 10 |
| Synthetic resin | 1 to 20 |
| Acetone | 50 |
| Benzene | 25 |
| Alcohol (ethyl or denatured) | 25 |
| Diacetone alcohol | 20 |

Example 5

The following is an example of a solution that is suitable as an adhesive, and is particularly useful for causing a sheet of celluloid to adhere to surfaces of sheets of glass, cardboard, asbestos, metal, etc.

| | Parts by weight |
|---|---|
| Cellulose acetate | 20 |
| Synthetic resin | 25 |
| Acetone | 60 |
| Ethyl acetate | 30 |
| Ethyl lactate | 10 |

Example 6

The following is an example of a plastic composition:

| | Parts by weight |
|---|---|
| Cellulose acetate | 100 |
| Synthetic resin | 40 |
| Monomethyl xylene sulphonamide | 10 |
| Alcohol | 50 |
| Benzene | 50 |

Example 7

The following is an example of a composition which may be employed for making artificial yarn by extruding it through the orifices of a spinnerette into an evaporative atmosphere.

| | Parts by weight |
|---|---|
| Cellulose acetate | 100 |
| Synthetic resin | 20 |
| Acetone | 400 |

Example 8

The following is a formula for a pigmented lacquer:

| | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

Example 9

The following examples are given to illustrate the use of the synthetic resin in connection with cellulose nitrate for various purposes:

(a) A coating compositon may contain:

| | | |
|---|---|---|
| Cellulose nitrate | kilograms | 6 |
| Camphor | do | 2 |
| Diethyl phthalate | do | 2 |
| Synthetic resin | do | 10 |
| Benzene | litres | 20 |
| Alcohol | do | 20 |
| Butyl alcohol | do | 20 |
| Butyl acetate | do | 20 |
| Ethyl acetate | do | 30 |

(b) An adhesive solution suitable for use in the preparation of laminated glass may contain:

| | | |
|---|---|---|
| Cellulose nitrate | kilograms | 0.4 |
| Camphor | do | 0.1 |
| Dibutyl phthalate | do | 0.1 |
| Synthetic resin | do | 1.0 |
| Benzene | litres | 20 |
| Alcohol | do | 10 |
| Butyl alcohol | do | 20 |
| Butyl acetate | do | 20 |
| Ethyl acetate | do | 30 |

In the foregoing examples cellulose acetate may be replaced by other organic esters of cellulose, while either the cellulose acetate or the cellulose nitrate may be replaced by cellulose ethers.

What I claim and desire to secure by Letters Patent is:—

1. Process for the manufacture of a synthetic resin comprising condensing an aldehyde with a dihydroxy-benzophenone.

2. Process for the manufacture of a synthetic resin comprising condensing an aldehyde with a dihydroxy-benzophenone, at least one of the nuclear hydrogen atoms of which is substituted by an alkyl group, at temperatures above atmospheric in the presence of a strong acid condensing agent.

3. Process for the manufacture of a synthetic resin comprising condensing formaldehyde with a dimethyl dihydroxy-benzophenone at temperatures above atmospheric in the presence of a strong acid condensing agent.

4. Process for the production of a synthetic resin comprising condensing formaldehyde with 3.3'-dimethyl-2.4'-dihydroxy-benzophenone at temperatures above atmospheric in the presence of a strong acid condensing agent.

5. Process for the production of a synthetic resin comprising condensing formaldehyde with 3.3'-dimethyl-4.4'-dihydroxy-benzophenone at temperatures above atmospheric in the presence of a strong acid condensing agent.

6. A synthetic resin formed by the condensation of an aldehyde with a dihydroxy-benzophenone.

7. A synthetic resin formed by the condensation of formaldehyde with a dihydroxy-benzophenone, at least one of the nuclear hydrogen atoms of which is substituted by an alkyl group, at temperatures above atmospheric in the presence of a strong acid condensing agent.

8. A synthetic resin formed by the condensation of formaldehyde with 3.3'-dimethyl-4.4'-dihydroxy-benzophenone at temperatures above atmospheric in the presence of a strong acid condensing agent.

9. A synthetic resin formed by the condensation of formaldehyde with 3.3'-dimethyl-2.4'-dihydroxy-benzophenone at temperatures above atmospheric in the presence of a strong acid condensing agent.

10. Process for the manufacture of a synthetic resin comprising condensing formaldehyde with a di-hydroxy benzophenone.

11. Process for the manufacture of a synthetic resin comprising condensing an aldehyde with a di-hydroxy benzophenone by heating under reflux.

12. Process for the manufacture of a synthetic resin comprising condensing formaldehyde with a di-hydroxy benzophenone by heating under reflux.

13. Process for the production of a synthetic resin comprising condensing formaldehyde with 2.4'-dihydroxy benzophenone.

14. Process for the production of a synthetic resin comprising condensing formaldehyde with 2.4'-dihydroxy-benzophenone in the presence of a strong acid condensing agent.

15. A synthetic resin formed by the condensation of formaldehyde with a dihydroxy-benzophenone.

16. Process for the manufacture of a synthetic resin, comprising condensing formaldehyde with a 3.3'-dimethyl-4.4'-dihydroxy-benzaphenone.

17. Process for the manufacture of a synthetic resin, comprising condensing formaldehyde with 3.3'-dimethyl-2.4'-dihydroxy-benzophenone.

18. A synthetic resin formed by the condensation of formaldehyde with a 2.4'-dihydroxy-benzophenone.

19. A synthetic resin formed by the condensation of formaldehyde with a 3.3'-dimethyl-4.4'-dihydroxy-benzophenone.

20. A synthetic resin formed by the condensation of formaldehyde with a 3.3'-dimethyl-2.4'-dihydroxy-benzophenone.

WILLIAM HENRY MOSS.